(12) United States Patent
Thiyagarajan et al.

(10) Patent No.: US 7,899,839 B2
(45) Date of Patent: Mar. 1, 2011

(54) QUERY REWRITE WITH A REMOTE OBJECT

(75) Inventors: Murali Thiyagarajan, Concord, NH (US); Praveen Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 11/777,231

(22) Filed: Jul. 12, 2007

(65) Prior Publication Data
US 2009/0018991 A1    Jan. 15, 2009

(51) Int. Cl.
*G06F 17/30* (2006.01)

(52) U.S. Cl. ................................. 707/760; 26/3
(58) Field of Classification Search .......... None
See application file for complete search history.

(56) References Cited

U.S. PATENT DOCUMENTS

| | | | |
|---|---|---|---|
| 5,991,754 A | 11/1999 | Raitto et al. | |
| 6,199,063 B1 | 3/2001 | Colby et al. | |
| 6,334,128 B1 | 12/2001 | Norcott et al. | |
| 6,449,606 B1 | 9/2002 | Witkowski | |
| 6,526,403 B1* | 2/2003 | Lin et al. ................. | 707/4 |
| 6,629,094 B1 | 9/2003 | Colby et al. | |
| 7,599,925 B2 | 10/2009 | Larson et al. | |
| 2004/0122814 A1 | 6/2004 | Zhang et al. | |
| 2005/0210010 A1* | 9/2005 | Larson et al. ................ | 707/3 |
| 2006/0122964 A1* | 6/2006 | Yu et al. ........................ | 707/2 |
| 2006/0230017 A1 | 10/2006 | Larson et al. | |
| 2006/0271529 A1 | 11/2006 | Dhamija et al. | |
| 2009/0228432 A1 | 9/2009 | Thiyagarajan et al. | |

OTHER PUBLICATIONS

Praveen Kumar and Murali Thiyagarajan, "Supporting Aggregate Expressions in Query Rewrite," pp. 1-18.
Randall G. Bello et al., "Materialized Views in Oracle," Proceedings of the 24th VLDB Conference, New York, USA, 1998, pp. 659-664.
Dr. Lilian Hobbs, "Oracle Materialized View & Query Rewrite," May 2005, pp. 1-25.

* cited by examiner

*Primary Examiner* — Charles Kim
*Assistant Examiner* — Anteneh Girma
(74) *Attorney, Agent, or Firm* — Hickman Palermo Truong & Becker LLP

(57) ABSTRACT

A query statement, issued to a local database server, is rewritten. The query references at least one of a first or a second object. The first object is remote with respect to the local database server, for accessing a first materialized view that is local or remote with respect to the local database server. The second object is local with respect to the local database server, to access a second materialized view that is remote with respect to the local database server. Rewriting the query can include dynamically tracking a staleness state associated with one or more of the materialized views.

18 Claims, 3 Drawing Sheets

Example Procedure 200

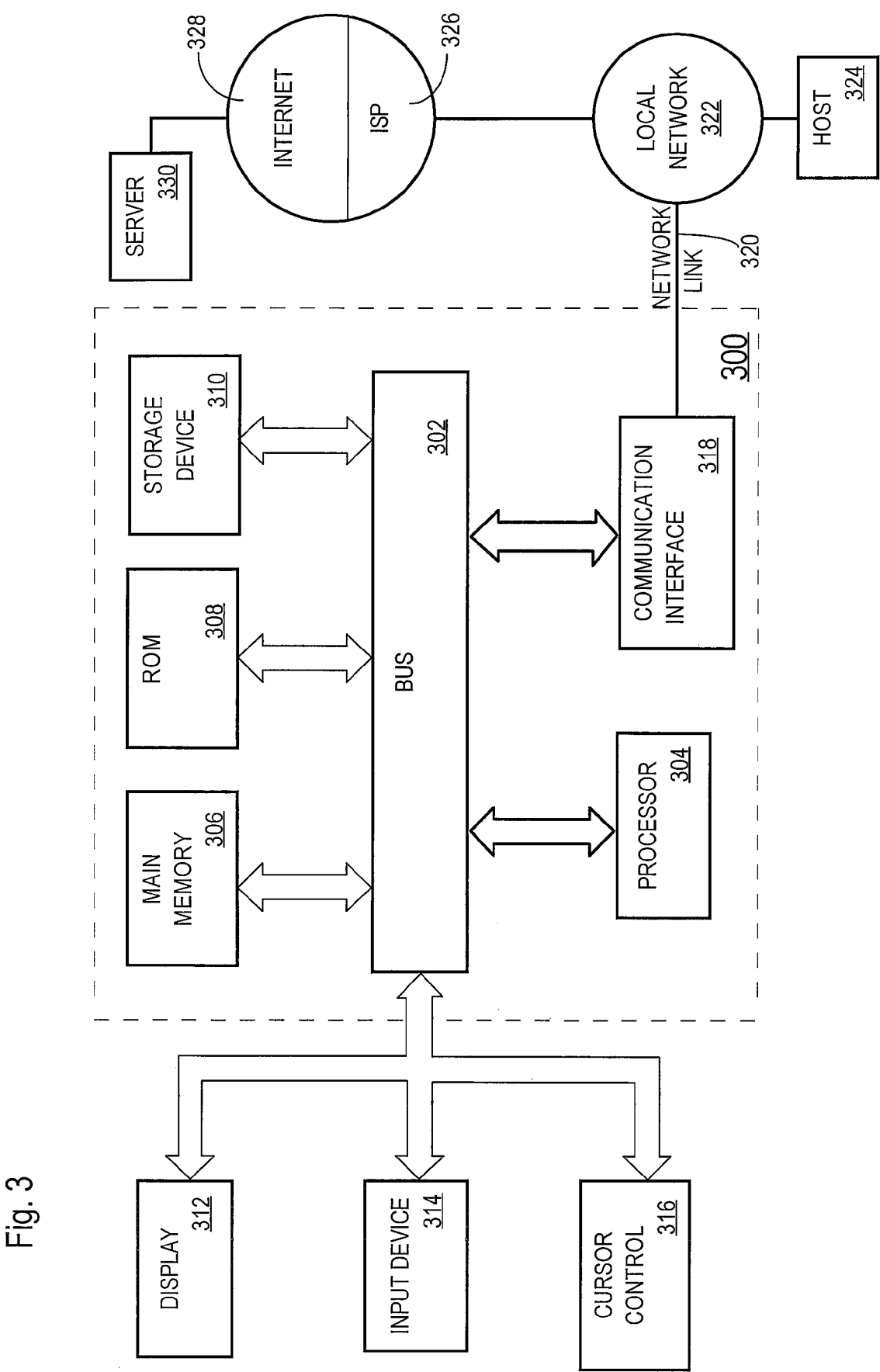

US 7,899,839 B2

QUERY REWRITE WITH A REMOTE OBJECT

TECHNOLOGY

The present invention relates generally to computing queries. More specifically, embodiments of the present invention relate to rewriting queries with a remote object.

BACKGROUND

Information is conveniently stored in repositories such as databases. Stored information is accessed and updated with applications executing in a database management system (DBMS). A DBMS may include one or more database servers that manage access to a database. A DBMS thus functions both to efficiently store information in one or more containers and as a database server to efficiently retrieve the information therefrom, on request. Each of the data containers of a database contains records. The data within each record is organized into one or more attribute fields. Various database architectures exist.

The data containers of relational databases are tables and the records stored therein are rows. The database can contain virtually any number of tables, the attributes of which, are referred to as columns. The data containers of an object oriented database are object classes, the records of which comprise objects, which have attributes referred to as object attributes. Other database architectures also exist. For simplicity and unity herein, a relational database is discussed, solely by way of example.

To retrieve data stored in a database, queries are submitted to a database server, which computes the query and returns the data requested therewith. Query statements submitted to a database server typically conform to the syntax of a particular database language supported by the DBMS. SQL (Structured Query Language) and PL/SQL (Procedural Language/SQL) are well known examples of such languages. Other database languages, some of them proprietary, are also used. For simplicity and unity, and solely by way of example, SQL statements are discussed herein. Unless otherwise indicated, terms and phrases are used herein in contexts explained in the four paragraphs that follow, below.

Views can allow the results of some queries to be computed more efficiently. The term "view" refers to a predefined query that is treated as a table. A view is thus essentially a virtual table and may be referenced by a database statement as if the view were an actual table. Tables that actually store the data associated with a view are referred to as "base tables." Base tables are referenced, directly or indirectly, by the predefined query. To generate the rows of a view, data is extracted and derived from the base tables. Changing data in a view's base table alters the data returned for a view.

Unless otherwise indicated, the term "Materialized View" (MV) refers to a view for which the results of the predefined query are stored as precomputed values. Materializing a materialized view obviates multiple executions of queries that may require significant time to compute. Thus, materializing a materialized view may allow faster and more efficient access to data.

Further, queries may be dynamically and transparently rewritten to reference one or more materialized views rather than base tables, which can boost database performance by allowing faster and more efficient computing of queries. Unless otherwise indicated, the term "query rewrite" herein refers to transforming a SQL query, expressed in terms of tables and views, into a statement that accesses the materialized views associated with those tables and views, instead. Inline views may be used to facilitate some query rewrites.

Information may be stored in one or more databases. When information is stored in more than one database, it can often be useful to access the information, regardless of which database it is stored in. In processing large quantities of information, speed and/or efficiency can be promoted by using and/or sharing information that is accessed from multiple databases or database instances. One or more certain database systems may function with one or more other database systems in what is referred to herein as a distributed database system. In a distributed database system, one database system may access database objects of (e.g., stored in) another database system.

In a distributed database system, an object or table may be stored in a certain database of the distributed database system that is managed by a local DBMS associated with the object or table, e.g., "local" to the certain database. Storage structures (e.g. files) that hold data for the locally stored objects or tables can be readily accessed by a database server of a local DBMS. In a distributed database system, an object or table that may not be readily accessed in this way by a certain DBMS may be stored in another database of another DBMS of the distributed database system. In such a case, the object or table is said to be "remote" to the certain DBMS and its local database. A DBMS may access a remote database object or table via another DBMS local to the remote object by, for example, issuing requests for queries to a database server of the local DBMS.

A query submitted to a DBMS of a distributed database system may refer to one or more database objects that may be stored at a remote database managed by another DBMS of the distributed database system. Queries may thus "contain" (e.g., reference) objects that are located DBMSs within the distributed database system.

In distributed database systems, queries have been rewritten with materialized views only in cases in which the materialized views contain localized database objects, i.e. the base tables of the materialized view were local objects. As a consequence, database applications that maintain tables in multiple database sites have essentially been limited in the use of query rewrite, e.g., to cases in which queries could have been rewritten using materialized views that refer to local database objects with respect to a DBMS receiving the query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Based on the foregoing, it would be useful to facilitate query rewrite using a remote object.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 depicts an example computer system platform, with which an embodiment of the present invention may be practiced.

DESCRIPTION OF EXAMPLE EMBODIMENTS

Rewriting queries that contain inline views is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to rewriting queries with a remote object. A query, issued to a local database server, is re-written. The query references at least one of a first or a second object. The first object is remote with respect to the local database server, for accessing a materialized view that is local or remote with respect to the local database server. The second object is local with respect to the local database server, to access a materialized view that is remote with respect to the local database server. In an embodiment, rewriting the query statement includes dynamically tracking a staleness state associated with the materialized view.

The example embodiments described herein facilitate query rewrite using inline views. Moreover, the example embodiments may thus enhance performance and efficiency relating to the operation of a DBMS.

Example Procedures

Procedures that may be implemented with an embodiment may be performed with more or less steps than the example steps shown and/or with steps executing in an order that may differ from that of the example procedures. The example procedures may execute on one or more computer systems under the control of machine readable instructions encoded in one or more computer readable storage media.

The example procedures described herein may be performed in relation to rewriting queries with a remote object. Example embodiments may be implemented with a database management system (DBMS). Embodiments of the present invention are not limited to any particular database architecture. The repository may store a body of records in one or more data containers. A data container may conform to tables in a relational database, a collection of objects (i.e. instances of object classes) in an object oriented database, or the like. The records within the body of records may conform to rows in a table, objects of an object class, or the like. The attributes of the records may conform to columns of the rows of a table, object attributes, or the like. For clarity, simplicity, unity, and brevity of description, the example procedures will be described with reference to a relational database. It should be appreciated however that embodiments are well suited to execution in any kind of database or other information repository architecture.

Figure 1:
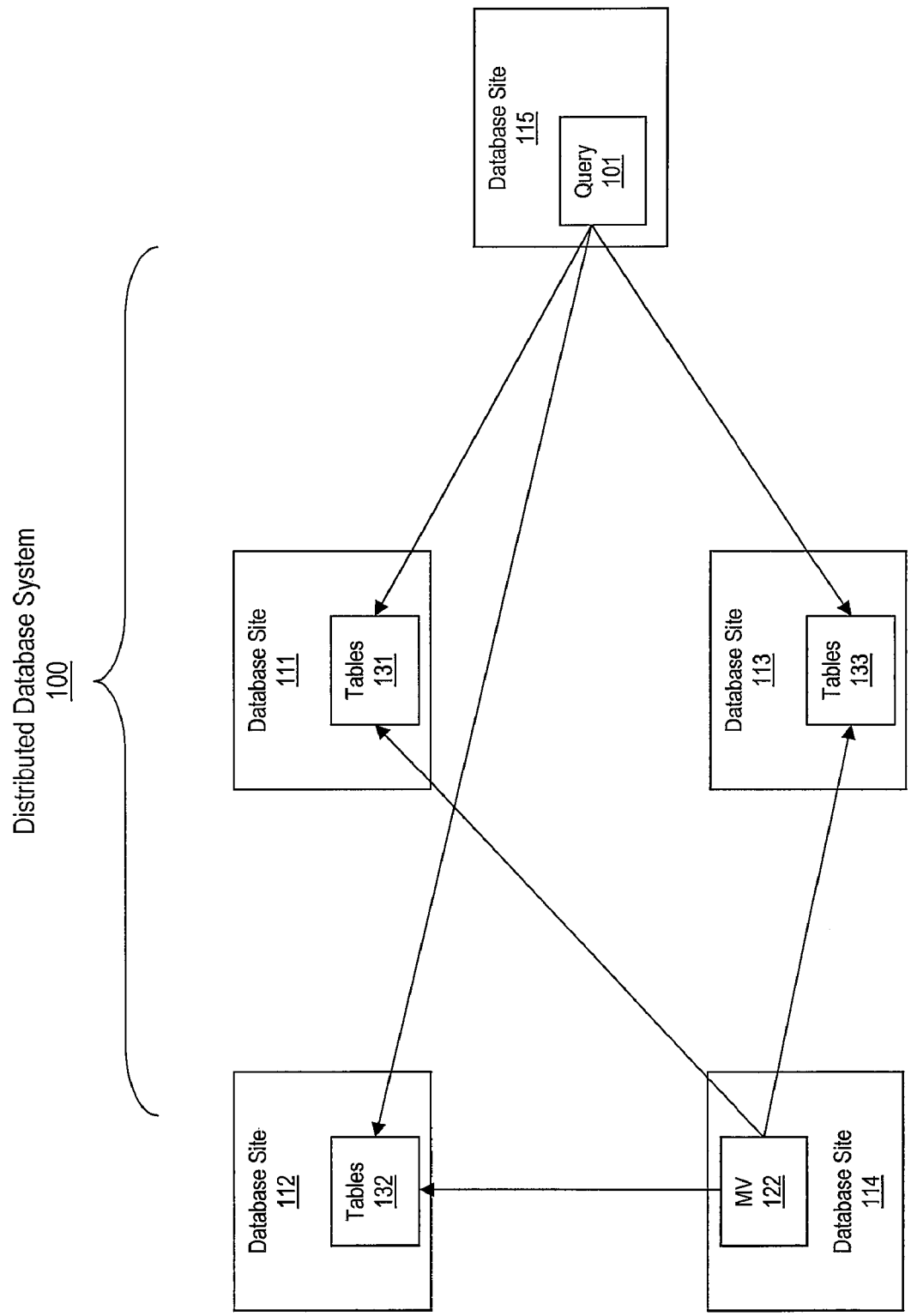
FIG. 1 depicts an example database system, according to an embodiment of the present invention.

In an embodiment, a query statement that references a remote object is rewritten. FIG. 1 depicts an example distributed database system 100, according to an embodiment of the present invention. Distributed database system 100 comprises a distributed database system with multiple remote databases are remote. In other words, database sites 111, 112 and 113 may be remote databases, with respect to one another.

Each of the databases in distributed database system 100 is essentially a database site with an associated DBMS which is local with respect to a given database site. Each of the database sites in distributed database system 100 is remote from each other site. The database sites are communicatively linked, e.g., coupled, over network 100.

Database sites 111, 112 and 113 of distributed database system 100 each store one or more tables. Table 131 is local to database site 111, table 132 is local to database site 112, and table 133 is local to database site 113. Database site 114 stores locally thereto a materialized view 122. Materialized view 122 references table 131, table 132 and table 133. In other words, tables 131-133 comprise base tables associated with materialized view 122.

As used herein, a subordinate set of a particular database object is essentially the set of all the database objects that refer to that particular database object. For a certain materialized view, each and every one of all of the database tables that are referenced by the materialized view, e.g., in the FROM clause thereof, are in the subordinate set of that certain materialized view. Similarly, any materialized views that reference one or more base tables of a database are in the subordinate set of each of those base tables. Thus, tables 131-133 are in the subordinate set of materialized view 122. Likewise, materialized view 122 is in the subordinate sets of each of the tables 131-133.

Database network 100 also has a database site 115. A database server locally associated with site 115 receives a query 101. Query 101 comprises a query statement that references table 131, table 132 and table 133. Thus, the query statement of query 101 references the same base tables, e.g., tables 131-133, that are referenced by materialized view 122.

Although materialized view 122 is remote from the database server of site 115, an embodiment of the present invention allows query 101 to be rewritten to reference materialized view 122, e.g., an object remote therefrom. In as much as materialized view 122 references the same base tables as query 101, an embodiment of the present invention allows communications traffic within network 100 to be minimized, which can increase network communication efficiency and economy therein and increases performance in distributed databases and applications running on the database instances of network 100.

An example semantic construct that may correspond to materialized view 122, which references remote tables 131-133, is shown as follows.

Example Materialized View that References Remote Tables

```
CREATE MATERIALIZED VIEW sum_sales_prod_week_mv
    ENABLE QUERY REWRITE AS
    SELECT p.prod_id, t.week_ending_day, s.cust_id,
        SUM(s.amount_sold) AS sum_amount_sold
    FROM sales@remotedb1 s,
        products@remotedb1 p, times@remotedb1 t
    WHERE s.time_id=t.time_id
        AND s.prod_id=p.prod_id
    GROUP BY p.prod_id,
        t.week_ending_day, s.cust_id;
```

An example semantic construct that may correspond to query statement 101, which also references remote tables 131-133, is shown as follows.

Example Query that References Remote Objects

```
SELECT p.prod_id, t.week_ending_day, s.cust_id,
    SUM(s.amount_sold) AS sum_amount_sold
    FROM sales@remotedb1 s,
        products@remotedb1 p, times@remotedb1 t
    WHERE s.time_id=t.time_id
    AND s.prod_id=p.prod_id
        GROUP BY p.prod_id,
            t.week_ending_day, s.cust_id;
```

As new data is periodically added to the base tables of a materialized view, the materialized view may not reflect the new base data. When a materialized view accurately reflects the data currently in its base tables, the materialized view is considered to be "fresh". Otherwise, the materialized view is considered to be "stale".

To rewrite query 101 to reference materialized view 122, an embodiment of the present invention determines whether the materialized view is stale. If the materialized view is stale, the query may not be rewritten to reference materialized view 122. A staleness state for the materialized view 122 is determined to decide whether or not materialized view 122 is stale or fresh. Further, an embodiment of the present invention obtains and/or maintains statistical information that relates to various remote objects within database network 100, such as a cardinality value associated with one or more of tables 131-133, which may have some significance to optimizing operations such as rewriting query 101.

In an embodiment, a staleness state associated with materialized view 122 is maintained. Tracking the staleness state of materialized view 122 is dynamically performed, which computes the staleness of materialized view 122 when the materialized view is considered as a candidate for rewriting a query. Information that relates to data manipulation language (DML) operations executed against materialized view 122 is maintained. For instance, an embodiment of the present invention maintains the last refresh system change notice (SCN; sometimes also referred to as a system commit number, assigned upon committing a DML function such as an, 'INSERT', 'DELETE', 'UPDATE', 'UPSERT', etc.) associated with materialized view 122.

Upon materialized view 122 being considered as a candidate for rewriting query 101, the corresponding SCN associated with each of its base tables 131-133 is obtained, e.g., via database network 100. Upon obtaining them, the SCNs of each the tables 131-133 is compared with the current SCN of materialized view 122. In an embodiment, one or more columns of metadata tables associated with materialized view 122 are used to store the related staleness information relating to the remote tables 131-133. Where the staleness state computed for materialized view 122 indicates that the information stored in the base tables 131-133 thereof is fresh, query 101 is rewritten using materialized view 122.

In as much as query 101 references tables 131-133 as remote objects, the query is rewritten in an embodiment where it is determined that, as rewritten using materialized view 122, the rewritten query is locally contained with respect to site 114, which is local to the materialized view. In other words, query 101 is rewritten using materialized view 122 where the information contained therein is fresh. In an embodiment, query 101 is rewritten after first establishing its eligibility in terms of localization to candidate materialized view 122, e.g., that as rewritten, it refers to fresh information stored in base tables 131-133. When rewritten with materialized view 122, query 101 is transformed to syntax that is local thereto.

Prior to using a join back operation for rewriting query 101, an embodiment determines both a networking cost savings associated with rewriting the query statement as well as a network cost associated with the join back computation and compares their relative expense. Query 101 is rewritten using a join back operation upon determining that the rewriting cost savings exceeds network cost of the join back operation, which may be significant; even substantial.

Figure 2:
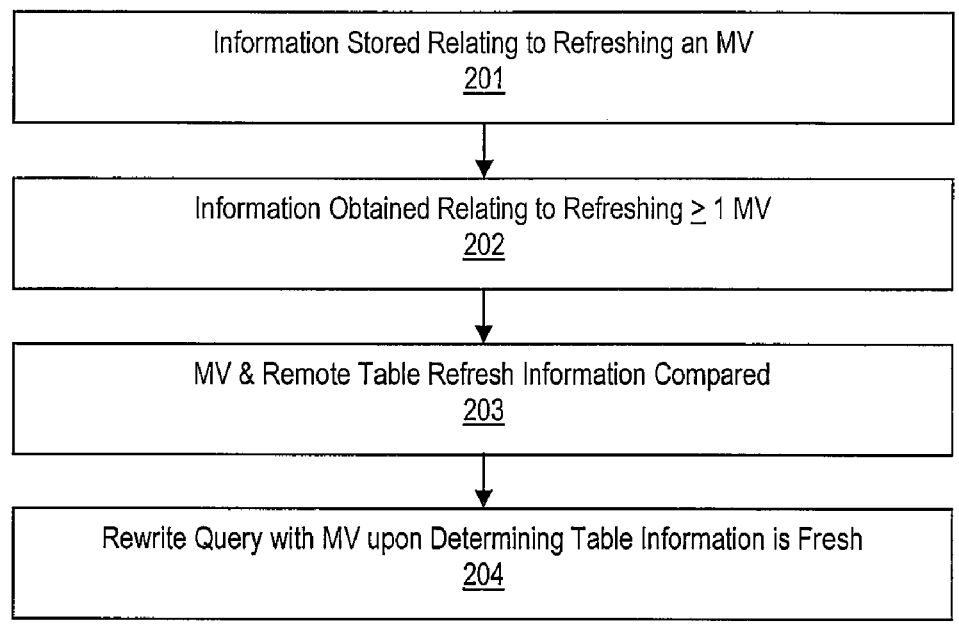
FIG. 2 depicts a flowchart for an example procedure, according to an embodiment of the present invention.

FIG. 2 depicts a flowchart for an example procedure 200, according to an embodiment of the present invention. In an embodiment, procedure 200 allows one or more queries to be rewritten. A query statement that is issued to a local database server may be rewritten where the query references an object that is local or remote with respect to the local database server receiving the query. This allows accessing a materialized view that is local or remote with respect to the local database server. A query statement that is issued to a local database server may be rewritten where the query references an object that is local with respect to the local database server receiving the query. This allows accessing a materialized view that is remote with respect to the local database server. Rewriting the query statement includes computing a staleness state that is associated with one or more of the materialized views.

In block 201, information is stored that relates to refreshing a materialized view. In block 202, information is obtained, which relates to refreshing one or more materialized views. In an embodiment, an SCN is stored in metadata descriptive of the materialized view when a DML operation is performed thereon. When the materialized view is considered as a candidate for rewriting a query, SCNs corresponding to the tables is retrieved.

In block 203, the SCNs obtained for its base tables are compared to the SCN of the materialized view to determine whether the materialized view is stale or fresh. Upon determining that the materialized view's base tables contain fresh information, the query is rewritten using the materialized view in block 204.

Example Computer System Platform

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), cathode ray tube (CRT) or the like, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for rewriting queries using remote objects. According to one embodiment of the invention, rewriting queries with remote objects is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and other conductors and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a digital subscriber line (DSL), cable or other modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for rewriting queries using remote objects, as described herein.

The received code may be executed by processor 304 as it is received, and/or stored in storage device 310, or other non-volatile storage for later execution. In this manner, computer system 300 may obtain application code in the form of a carrier wave.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    determining whether one or more criteria are satisfied for rewriting a query statement to access one or more materialized views that include a remote materialized view;

wherein, before rewriting the query statement, the query statement references an object but does not reference said one or more materialized views;

wherein the query statement is issued to a local database server;

wherein the object comprises a remote object or a local object with respect to the local database server;

wherein the remote materialized view is remote with respect to the local database server;

wherein determining whether one or more criteria is satisfied includes:
    the local database server computing a staleness state that is associated with said remote materialized view;

wherein the one or more criteria are based on the staleness state;

wherein the method is performed by one or more computing devices.

2. The method as recited in claim 1, wherein the one or more of the materialized views reference one or more tables that are remote therefrom; and
    wherein computing the staleness state comprises:
        storing materialized view refreshing information relating to refreshing the remote materialized view;
        obtaining remote tables changing information related to changing one or more of the remote tables; and
        comparing the materialized view refreshing information to the remote tables changing information.

3. The method as recited in claim 2, wherein the materialized view refreshing information and the remote tables changing information comprise a system change number.

4. The method as recited in claim 2, wherein the remote tables changing information is stored with metadata that describes the remote materialized view.

5. The method as recited in claim 4, wherein the remote tables changing information is stored as a value in a column of a table in which the metadata is stored.

6. The method as recited in claim 2, wherein, upon comparing the materialized view refreshing information to the remote tables changing information, the query statement is rewritten where the staleness state of the one or more materialized views is computed to indicate that the one or more materialized views are not stale.

7. The method as recited in claim 2, wherein computing the staleness state comprises:
    dynamically tracking the staleness state of the one or more of the materialized views, wherein the staleness state is computed upon considering the one or more materialized views for rewriting the query statement.

8. The method as recited in claim 1, further comprising:
    for the remote materialized view that references the remote object, determining that a statement that results from rewriting the query statement is locally containable with respect to the local database server; and
    rewriting the query statement.

9. The method as recited in claim 1, wherein the remote materialized view references the remote object, and the query statement is rewritable using a join back computation, the method further comprises:
    determining rewriting cost savings associated with rewriting the query statement;
    determining a network cost associated with the join back computation;
    comparing the rewriting cost savings with the network cost of the join back computation; and
    rewriting the query statement using the join back computation upon determining that the rewriting cost savings exceed the network cost of the join back computation.

10. A non-transitory computer readable storage medium having instructions encoded therewith which, when executed by one or more processors of a computer system, cause the processors to execute the method recited in claim 1.

11. A non-transitory computer readable storage medium having instructions encoded therewith which, when executed by one or more processors of a computer system, cause the processors to execute the method recited in claim 2.

12. A non-transitory computer readable storage medium having instructions encoded therewith which, when executed by one or more processors of a computer system, cause the processors to execute the method recited in claim 3.

13. A non-transitory computer readable storage medium having instructions encoded therewith which, when executed by one or more processors of a computer system, cause the processors to execute the method recited in claim 4.

14. A non-transitory computer readable storage medium having instructions encoded therewith which, when executed by one or more processors of a computer system, cause the processors to execute the method recited in claim 5.

15. A non-transitory computer readable storage medium having instructions encoded therewith which, when executed by one or more processors of a computer system, cause the processors to execute the method recited in claim 6.

16. A non-transitory computer readable storage medium having instructions encoded therewith which, when executed by one or more processors of a computer system, cause the processors to execute the method recited in claim 7.

17. A non-transitory computer readable storage medium having instructions encoded therewith which, when executed by one or more processors of a computer system, cause the processors to execute the method recited in claim 8.

18. A non-transitory computer readable storage medium having instructions encoded therewith which, when executed by one or more processors of a computer system, cause the processors to execute the method recited in claim 9.

* * * * *